United States Patent [19]

Acomb

[11] Patent Number: 4,516,595
[45] Date of Patent: May 14, 1985

[54] GAS PRESSURE REDUCING REGULATOR AND ADAPTER

[75] Inventor: Byron H. Acomb, Florence, S.C.

[73] Assignee: Union Carbide Corporation, Danbury, Conn.

[21] Appl. No.: 510,732

[22] Filed: Jul. 5, 1983

[51] Int. Cl.³ ............................................. F16K 13/04
[52] U.S. Cl. ........................................ 137/73; 137/75; 137/505.29; 137/505.42; 137/505
[58] Field of Search ...................... 137/72, 73, 74, 75, 137/505.26, 505.29, 505.34, 505.42, 505

[56] References Cited

U.S. PATENT DOCUMENTS

| | | | |
|---|---|---|---|
| 1,264,006 | 4/1918 | Bucknam | 137/505.42 |
| 2,868,224 | 1/1959 | Karlsson | 137/505.42 X |
| 3,791,412 | 2/1974 | Ways | 137/505.42 X |
| 4,282,766 | 8/1981 | Huber | 137/505.42 X |

*Primary Examiner*—Harold W. Weakley
*Attorney, Agent, or Firm*—Eugene Lieberstein

[57] ABSTRACT

A diaphragm type gas pressure reducing regulator and adapter in combination in which the adapter serves to isolate the diaphragm from the valve seat in the regulator in response to a spontaneous ignition. The adapter comprises a plunger which intercouples the valve and the diaphragm assembly during normal operation of the regulator and isolates the diaphragm assembly from the valve in response to a spontaneous ignition within the regulator body upstream of the diaphragm assembly.

7 Claims, 1 Drawing Figure

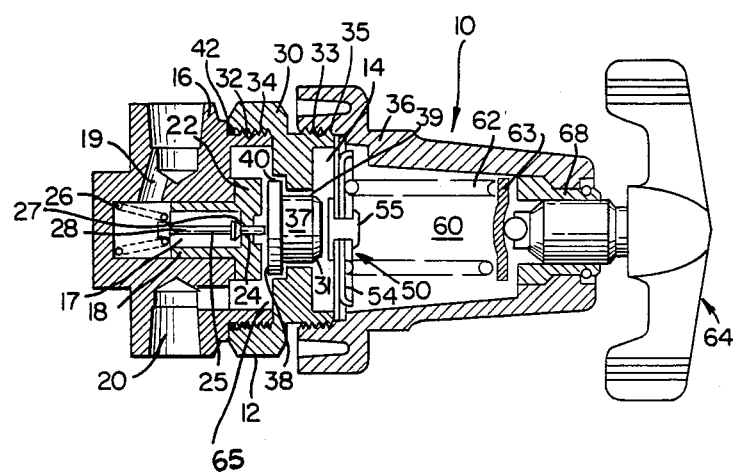

GAS PRESSURE REDUCING REGULATOR AND ADAPTER

This invention relates to a gas pressure reducing regulator in combination with an adapter which minimizes the potential danger from the occurrence of a regulator burnout.

Fluid pressure reducing regulators for converting an inlet gas such as oxygen supplied from an external variable pressure source at relatively high pressure to a relatively constant low delivery pressure have been in commercial use for a substantial number of years. Throughout each year reports of pressure regulator oxygen burnout are received. When oxygen burnout does occur the potential for serious operator injury exists if the burnout causes a break through the regulator housing. Conditions contributing to a burnout are believed to be due to an accelerated rise in temperature attributable to adiabatic compression followed by ignition of the valve seat and other internal elements such as the diaphragm. When the diaphragm ignites, the burning gases and molten material can erupt with near explosive violence. Although the potential of oxygen burnout is present in all commercially available regulators, no solution has heretofore been found to eliminate or minimize the likelihood of injury from a burnout.

In accordance with the present invention the diaphragm chamber is automatically closed off and isolated from the valve and the upstream components in the valve body in response to a combustion wave or high temperature hot gases. By immediately closing off the diaphragm chamber, ignition of the diaphragm is essentially prevented thereby substantially reducing the potential for operator injury.

It is therefore the principle object of the present invention to provide a diaphragm type gas pressure reducing regulator in combination with an adapter for isolating the diaphragm chamber and diaphragm from the valve body in response to the presence of hot gases internal of the valve body.

It is a further object of the present invention to provide an adapter for a diaphragm gas pressure reducing regulator which operates in conjunction with the valve assembly during normal operation of the regulator and which seals off the diaphragm from the valve body in response to the presence of hot combustion gases in the valve body.

Other objects and advantages of the present invention will become apparent from the following detailed description of the invention when read in conjunction with the accompanying drawing which is a sectional view in side elevation of a diaphragm type gas pressure reducing regulator shown in combination with the adapter of the present invention.

Referring now to the single figure drawing illustrating a typical diaphragm type pressure reducing regulator 10 incorporating an adapter 12 which functions in accordance with the present invention to isolate and close off the diaphragm chamber 14 from the hot gases of combustion due to a spontaneous ignition upstream of the diaphragm chamber 14.

The regulator 10 has a body 16 surrounding a high pressure valve chamber 17 in which is mounted a regulator valve generally depicted as 18. The body 16 of the regulator 10 has an inlet 19 for supplying gas at high pressure from a source (not shown) to the valve chamber 17 and an outlet 20 for discharging regulated gas at relatively low pressure.

The regulator valve 18 comprises a valve nozzle 22 threadably connected to the valve chamber 17, a valve seat 24 in the valve nozzle 22 and a slidable valve member 25 disposed within a tubular section of the valve nozzle 22. The slidable valve member 25 is in alignment with the valve seat 24. The slidable valve member 25 contains an elastomer material having an high resistance to combustion. A valve closing spring 26 bears against the sliding valve member 25 for pushing the valve member 25 against the valve seat 24. A valve stem or push pin 28 projects from the valve member 25 and extends through the valve seat 24. A valve orifice 27 is formed between the push pin 28 and the valve seat 24.

The body 16 of the regulator 10 is coupled to a bonnet 36 by means of the adapter 12 which comprises a connecting member 30 and a plunger 31 both preferably of metal. The connecting member 30 is threaded at opposite ends 32 and 33 for engaging the threads 34 in the regulator body 16 and the threads 35 in the bonnet 36. The plunger 31 is a cylindrical insert 37 having a head 38 of slightly larger diameter than the insert. The insert 37 is slidably mounted in the bore 39 of the connecting member 30. The bore 39 has a counterbore 40 adapted to receive the head 38 of the plunger 31. The bore 39 is centrally located in the connecting member 30 so that the plunger 31 is axially aligned with the push pin 28 extending from the valve member 25. The adapter 12 also includes an "O" ring 42 positioned at the interface 43 between the connecting member 30 and the shoulder 44 of the regulator body 16 to prevent leakage between the connecting member 30 and the body 16 of the regulator 10.

A diaphragm assembly 50 is securely clamped between the connecting member 30 of the adapter 12 and the bonnet 36 to form the diaphragm chamber 14. The diaphragm assembly 50 includes a diaphragm 53 formed of a flexible material such as rubber, a flat diaphragm plate 54 on the nonregulated side of the diaphragm assembly 50 and a rivet 55 which holds the diaphragm assembly 50 together.

The bonnet 36 forms a bonnet chamber 60 in which a pressure adjusting spring 62 is mounted between the diaphragm plate 54 and a spring plate 63. A manually adjustable adjusting screw assembly 64 is threaded in a bushing 68 mounted in the bonnet 36. The screw assembly 64 engages the spring plate 63.

In operation, the manually adjustable adjusting screw 64 is screwed in to establish the desired delivery pressure. The pressure adjusting spring 62 applies a downward pressure upon the diaphragm plate 54 which moves the diaphragm assembly 50 into contact with the plunger 31. The plunger 31 in turn engages and moves the push pin 28 in the upstream direction against the applied force from the valve closing spring 26 to open the regulator valve 18. Gas flows through the valve orifice 27 into the low pressure chamber 65 from whence it exits through the discharge outlet 20. During normal regulator operation the low pressure chamber 65 is in communication with the diaphragm chamber 14 through the bore 39 with the low pressure chamber 65 and the diaphragm chamber 14 being at the same low pressure. The plunger 31 during normal regulator operation serves only as an intermediate coupling between the push pin 28 and the diaphragm assembly 50.

In the event of a spontaneous ignition of the valve seat 24 in the regulator 10 due to e.g., an accelerated rise in temperature attributable to the heat of compression or a chemical reaction from the presence of hydrocarbons or friction from high velocity gas or from moving foreign particles, sparks, etc. hot gas will pass from the valve seat 24 through the valve orifice 27 into the low pressure chamber 65. This, in turn, will increase the pressure in the low pressure chamber 65 forcing the plunger 31 into the counterbore 40 with the head 38 of the plunger 31 abutting the surface 67 of the counterbore 40 to seal off the diaphragm chamber 14 from the low pressure chamber 65. With the diaphragm chamber 14 isolated from the low pressure chamber 65 the opportunity for the diaphragm 53 to ignite is virtually eliminated. In fact, in practice it has not been possible, after repeated attempts, to cause the diaphragm 53 to ignite following deliberate ignition of the valve seat 24.

I claim:

1. A gas pressure reducing regulator in combination with an adapter for minimizing the potential danger from the occurrence of a regulator burnout comprising: a regulator body having an inlet opening adapted to be connected to a source of relatively high pressure gas containing oxygen; an outlet opening for discharging said gas at a relatively controlled reduced pressure; a valve chamber in said regulator body; a valve assembly mounted in said valve chamber and having a valve nozzle, a valve seat and a slidable valve member; a push pin extending from said slidable valve member through said valve seat; a bonnet having a bonnet chamber; a diaphragm assembly having a flexible diaphragm for forming a diaphragm chamber between said bonnet chamber and said valve chamber and with said adapter comprising: connecting means for removably coupling said regulator body to said bonnet and for forming an isolation chamber for isolating said valve assembly from said diaphragm assembly in response to a regulator ignition, said isolation chamber being in open communication with said diaphragm chamber during normal operation of said regulator; and a free floating plunger slidably mounted in said connecting means and extending between said push pin and said diaphragm assembly for moving said diaphragm assembly in response to the movement of said push pin during normal operation of said regulator and for sealing off said isolation chamber from said diaphragm chamber in response to an ignition in the regulator body.

2. A gas pressure reducing regulator as defined in claim 1 wherein said plunger has a cylindrical body with a head of larger diameter than that of the body.

3. A gas pressure reducing regulator as defined in claim 2 wherein said bore is substantially concentric with the longitudinal axis of said regulator body and wherein said connecting means further comprises a counterbore adapted to receive the head of the plunger.

4. A gas pressure reducing regulator as defined in claim 3 further comprising an O-ring disposed between said connecting means and said regulator body for preventing leakage between said connecting means and said regulator body.

5. An adaptor for use in a diaphragm type gas pressure reducing regulator having a regulator body and a bonnet and including a diaphragm assembly and a valve assembly with the valve assembly having a valve nozzle, a valve seat, a slidable valve member and a push pin extending from the valve member through the valve seat, with the diaphragm assembly separated from the valve assembly by a diaphragm chamber, said adapter comprising connecting means for removably coupling said regulator body from said bonnet and for forming an isolation chamber for isolating said valve assembly from said diaphragm assembly in response to a regulator ignition, said isolation chamber being in open communication with said diaphragm chamber during normal operation of said regulator and a free floating plunger slidably mounted in said connecting means and extending between said push pin and said diaphragm assembly for moving said diaphragm assembly in response to the movement of said push pin during normal operation of said regulator and for sealing off said isolation chamber from said diaphragm chamber in response to an ignition in said regulator.

6. An adaptor as defined in claim 5 wherein said plunger has a cylindrical body with a head of larger diameter than that of the body and wherein said connecting means has a bore in which said plunger is slidably mounted and a counterbore to receive the head of said plunger.

7. An adaptor as defined in claim 5 or 6 wherein said connecting means and plunger is metal.

* * * * *